US008578149B2

(12) United States Patent  
Tateishi et al.

(10) Patent No.: US 8,578,149 B2
(45) Date of Patent: Nov. 5, 2013

(54) TCP COMMUNICATION SCHEME

(75) Inventors: Yasushi Tateishi, Numazu (JP); Tatsuya Okuro, Numazu (JP); Yasunori Nishibe, Numazu (JP); Takashi Habutsu, Numazu (JP)

(73) Assignee: Meidensha Corporation, Tokyo (JP)

( * ) Notice: Subject to any disclaimer, the term of this patent is extended or adjusted under 35 U.S.C. 154(b) by 279 days.

(21) Appl. No.: 13/146,532

(22) PCT Filed: Jan. 26, 2010

(86) PCT No.: PCT/JP2010/050955
§ 371 (c)(1),
(2), (4) Date: Jul. 27, 2011

(87) PCT Pub. No.: WO2010/087326
PCT Pub. Date: Aug. 5, 2010

(65) Prior Publication Data
US 2011/0289312 A1    Nov. 24, 2011

(30) Foreign Application Priority Data

Jan. 28, 2009    (JP) .................. 2009-016342
Nov. 16, 2009    (JP) .................. 2009-260553

(51) Int. Cl.
*H04L 29/06*    (2006.01)

(52) U.S. Cl.
USPC .......................................... 713/153; 713/151

(58) Field of Classification Search
USPC .................................................. 713/153, 151
See application file for complete search history.

(56) References Cited

U.S. PATENT DOCUMENTS 7,830,878 B2    11/2010    Furukawa
2001/0047474 A1*    11/2001    Takagi et al. ............... 713/153

FOREIGN PATENT DOCUMENTS

| JP | 2006-87010 A | 3/2006 |
| JP | 2006-191205 A | 7/2006 |
| JP | 2006-196996 A | 7/2006 |
| JP | 2007-60494 A | 3/2007 |
| JP | 2008-118577 A | 5/2008 |
| JP | 2008-219531 A | 9/2008 |
| JP | 2008-227923 A | 9/2008 |
| JP | 2008-301024 A | 12/2008 |

OTHER PUBLICATIONS

Morihiro Kouda et al., Proxy Mechanism of Multiplexing TCP Connections over Satellite Internet, Technical Report of IEICE, Mar. 2002, pp. 69-76, vol. 101, No. 716.

* cited by examiner

*Primary Examiner* — Jeffrey Pwu
*Assistant Examiner* — Thong Truong
(74) *Attorney, Agent, or Firm* — Foley & Lardner LLP

(57) ABSTRACT

A TCP communication scheme which ensures safe communication up to the communication path near a terminal and eliminates direct attacks from hackers, etc. A terminal (A) and terminal (B) are connected to a relay apparatus (X) and relay apparatus (Y), where the terminal (A) and the terminal (B) are the endpoint terminals positioned at the two ends of a TCP communication connection. The relay apparatuses (X, Y) are each connected to a network (NET). The relay apparatuses (X and Y) are provided so as to be between the terminals (A and B) which had been performing conventional TCP communication, and neither of the relay apparatuses (X and Y) have IP addresses. The relay apparatuses (X and Y) take over the TCP connection between the terminal (A) and the terminal (B), divide the connection into three TCP connections, and establish TCP communication.

3 Claims, 10 Drawing Sheets

TCP COMMUNICATION SCHEME

TECHNICAL FIELD

The present invention relates to a TCP communication scheme for relay between TCP networks, to which a specific function, such as an encrypted communication function, is added.

BACKGROUND OF THE INVENTION

A VPN (Virtual Private Network) router is a device inserted between endpoint communication terminals, for adding a specific function to communication therebetween. The VPN router is a device provided between two networks for adding a function of encrypting communication therebetween.

There are two types of VPN routers. One is an IP-VPN type for connection using a VPN network provided by a carrier. The other is an Internet VPN type for connection through the internet wherein a VPN device is inserted by a user himself. In general, the former is used as a LAN-to-LAN-connecting VPN for connecting LANs to each other as shown in FIG. 9, and the latter is used as a remote access VPN for connecting a terminal PC to a LAN as shown in FIG. 10.

In FIGS. 9, 1 and 2 represent local LANs, and 3 and 4 represent VPN routers. A section between VPN routers 3, 4 is a VPN section (see patent documents 1, 2).

In FIG. 10, 5 represents a VPN terminal PC, 6 represents a VPN router, and 7 represents a local LAN. A section between VPN terminal PC 5 and VPN router 6 is an internet VPN section (see patent documents 3, 4).

PRIOR ART DOCUMENT

Patent document

Patent document 1: JP 2008-118577 A
Patent document 2: JP 2008-227923 A
Patent document 3: JP 2008-219531 A
Patent document 4: JP 2008-301024 A

SUMMARY OF THE INVENTION

Problem(s) to be Solved by the Invention

There are the following problems with the VPNs described above.

(a) Communication outside of the VPN section allows free intrusion and is therefore unsafe. This leads to a high cost in case of arrangement that the VPN section is extended close to the terminals.

(b) It is necessary to allocate a global IP address to the VPN device itself although only a small number of global IP addresses are available.

(c) Device setting is intricate and requires high-level knowledge.

In view of the foregoing, it is an object of the present invention to provide a TCP communication scheme with which safe communication is possible through communication paths close to terminals, and a device is invisible on a network because of no allocation of IP address so that direct attacks from hackers are prevented.

Means for Solving the Problem(s)

In order to achieve the object described above, the invention according to claim 1 is characterized in that: first and second terminals are provided and connected by TCP to each other through a network; a first relay device is provided in a transmission line between the first terminal and the network; a second relay device is provided in a transmission line between the network and the second terminal; the first and second relay devices are connected to each other through the network; the first and second relay devices establish three divisional TCP connections between the first terminal and the first relay device, between the first relay device and the second relay device, and between the second relay device and the second terminal; the first and second relay devices perform TCP communication through the TCP connections; and the first and second relay devices add a specific function to the TCP communication.

The invention according to claim 2 is characterized in that in claim 1, the first and second relay devices catch TCP connection SYN packets, and establish the TCP connections on behalf of the first and second terminals without having IP addresses.

The invention according to claim 3 is characterized in that in claim 1 or 2, the specific function includes: an encrypted communication function implementing a means for encryption and decryption; an anti-virus function implementing a procedure for interrupting unauthorized TCP communication; a load distributing function implementing a procedure for distributing transmission depending on load condition; a bandwidth control function implementing a procedure for congestion control and bandwidth control; and a gateway function implementing a procedure for relay for a special line.

The invention according to claim 4 is characterized in that: first and second terminals are provided and connected by TCP to each other through a network; a first relay device is provided in a transmission line between the first terminal and the network; a second relay device is provided in a transmission line between the network and the second terminal; the first and second relay devices are connected to each other through the network; the first and second relay devices perform a procedure of three divisional TCP connections between the first terminal and the first relay device, between the first relay device and the second relay device, and between the second relay device and the second terminal; and the first and second relay devices establish only the TCP connection between the first and second relay devices, when authorizing the first and second relay devices by exchanging information with each other during the procedure of connection before the procedure of connection is completed.

The invention according to claim 5 is characterized in that in claim 4, the first and second relay devices implement the authorization by exchanging information for model identification.

The invention according to claim 6 is characterized in that in claim 4, a function of proactive key exchange for encrypted communication is implemented by exchanging key information proactively.

Effect(s) of the Invention

The present invention brings an advantage of allowing safe communication through communication paths close to terminals, and making a device invisible on a network because of no allocation of IP address so that direct attacks from hackers are prevented. Moreover, the present invention brings an advantage of making it unnecessary to change the configuration and setting of the network, and install special-purpose software in the terminals, and change applications in the terminals because of independency from applications. Moreover, the present invention brings an advantage of allowing coexistence with other communication protocols without affecting existing communication, and allowing free choice and extension of functions to be added.

Moreover, the present invention brings an advantage of: making it unnecessary to change the configuration and setting of the network, and using an existing standard protocol stack, and thereby reducing the implementing cost; preventing a communication band from being consumed unnecessarily, because of completion within the standard TCP connection procedure; and preventing TCP connection with unauthorized terminals, and thereby preventing computer resources from being consumed by malicious attacks. Moreover, the present invention brings an advantage of: making it possible to achieve the object in cases where the first and second relay devices are compatible with the TCP options by default, or even in cases where they are incompatible with the TCP options; and making it unnecessary to use an additional TCP port number.

MODE(S) FOR CARRYING OUT THE INVENTION

The following describes embodiments of the present invention in detail with reference to the drawings.

Embodiment 1

Figure 1:
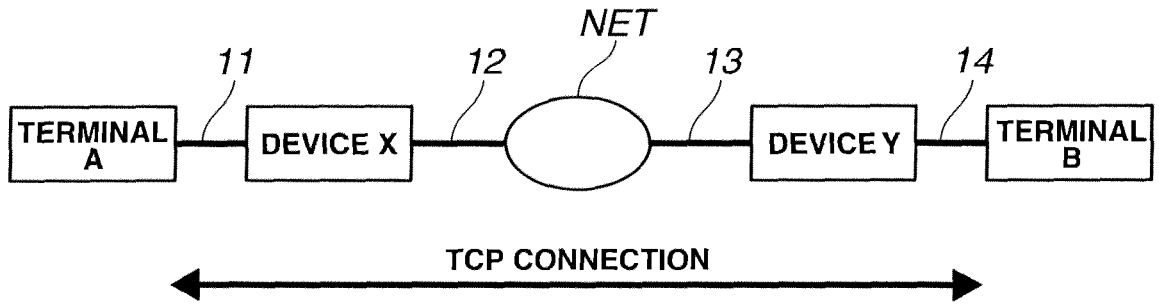
FIG. 1 is a network configuration diagram showing a TCP communication scheme according to an embodiment 1.

FIG. 1 is a network configuration diagram showing a TCP communication scheme according to an embodiment 1. In FIG. 1, terminals A, B are endpoint terminals located on opposite ends of TCP communication. Terminals A, B are connected to relay devices X, Y through transmission lines 11, 14, respectively. Relay devices X, Y are connected to a network NET through transmission lines 12, 13, respectively.

Relay devices X, Y are provided and inserted in a section between terminals A, B between which communication has been made previously. Relay devices X, Y are allocated with no IP addresses. For ease of explanation, terminals A, B are henceforth referred to as active side and passive side of TCP connection, respectively.

Relay devices X, Y intercept TCP connection between terminals A, B, and divide same into three TCP connections, and establish TCP communication.

The following describes operations of active-side and passive-side relay devices X, Y.

(1) Operation of Active-Side Relay Device X (a) Relay device X waits in promiscuous mode. Promiscuous mode is one of operation modes of LAN card. In contrast to normal mode in which relay device X receives only packets whose target addresses indicate relay device X, relay device X receives packets having any target addresses in promiscuous mode.

(b) Relay device X catches a SYN (synchronize) packet that is a packet sent from terminal A for beginning TCP connection.

(c) Relay device X obtains from information of the SYN packet a sender IP address (obtained from the IP header), a sender port number (obtained from the TCP header), a target IP address (obtained from the IP header), and a target IP port (obtained from the TCP header).

(d) Relay device X begins TCP connection to the obtained target address while behaving as terminal A.

Figure 2:
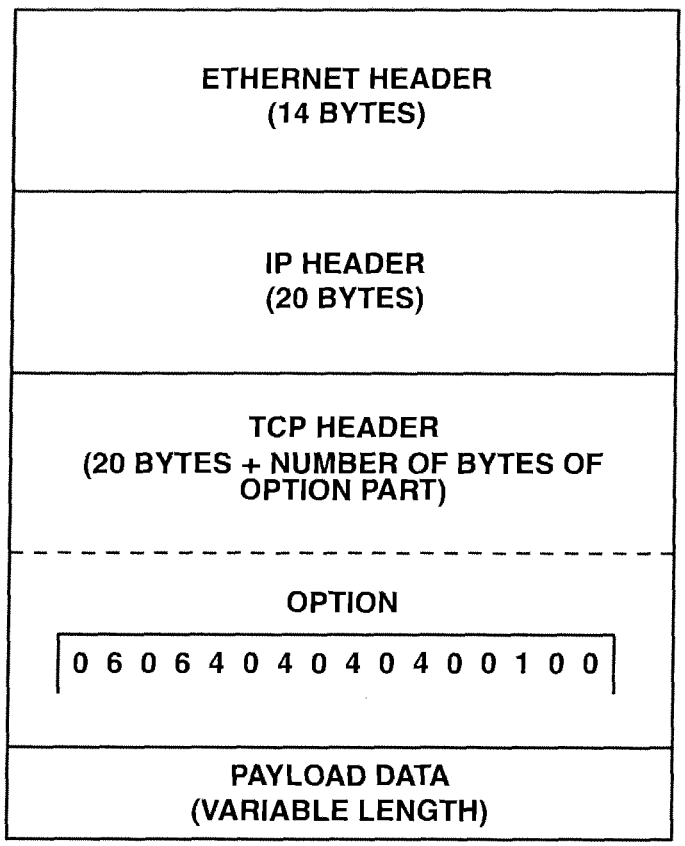
FIG. 2 shows the frame format of Ethernet (registered trademark)

(e) At this time, the SYN packet is added with an identifier indicative of relay device X. The following describes this identifier with reference to the frame format of Ethernet (registered trademark) shown in FIG. 2. TCP option fields (henceforth referred to as TCP options) contained in the TCP header are used.

The active-side uses a TCP option of type code 06, and the passive-side uses a TCP option of type code 07. The digits "06" following the type code "06" or "07" indicate the data length of the TCP option. The following digits "04 . . . 0400100" or "C0 . . . 000100" indicate an identifying code (identifier) which is defined originally. Values of the identifying code can be defined to indicate different meanings so that the identifying code can be used for various usages.

(f) When a reply packet (SYN+ACK (Acknowledge)) from passive-side relay device Y is added with a similar identifier, relay device X recognizes that there is a counterpart relay device on the opposite side, and continues this procedure. For example, the procedure includes sending an ACK packet back to passive-side relay device Y.

(g) At the time when TCP connection with relay device Y is completed, TCP connection with terminal A is completed. By this connection, relay device X performs an operation of sending a (SYN+ACK) packet back to terminal A, and an operation of awaiting an ACK packet from terminal A.

Figure 3A:
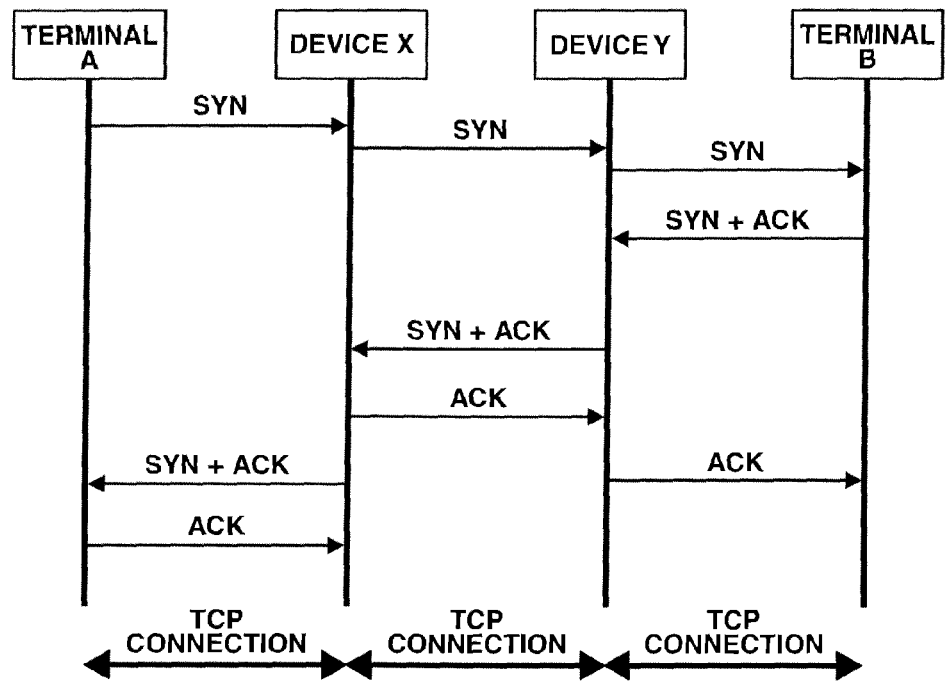
FIGS. 3A and 3B are diagrams showing divisional TCP connections.

The foregoing explanation is illustrated in FIG. 3A that is a diagram showing divisional TCP connections.

(2) Operation of Passive-Side Relay Device Y (a) Relay device Y waits in promiscuous mode.

(b) Relay device Y catches the SYN packet sent from relay device X.

(c) Relay device Y obtains from information of the SYN packet the sender IP address, sender port number, target IP address, and target port number.

(d) Relay device Y begins TCP connection to terminal B while behaving as terminal A.

(e) When receiving a reply packet of (SYN+ACK) from terminal B, relay device Y adds the "identifier" to the TCP option in (SYN+ACK), and sends the reply packet of (SYN+ACK) to relay device X while behaving as terminal B.

(f) At the time when TCP connection with relay device X is completed, TCP connection with terminal B is completed.

The foregoing explanation is illustrated by FIG. 3A.

(3) Establishment of Divided TCP Connections

When the operations (1), (2) are completed, the original single TCP connection between terminal A and terminal B is divided into three TCP connections between terminal A and relay device X, between relay device X and relay device Y, and between relay device Y and terminal B.

Accordingly, payload data on TCP is relayed and transmitted through the three TCP connections between the terminals, where existence of the relay devices is unrecognizable, namely, the relay devices are invisible to the terminals.

Regarding the TCP connection between relay devices, payload data may be processed arbitrarily depending on agreement between the relay devices. This can be used to add the divisional TCP communication with a specific function.

The foregoing explanation is silent about data transmission. Data is transmitted simply between terminal A and terminal B. The data is processed in some way between relay device X and relay device Y, and is transmitted.

Figure 3B:
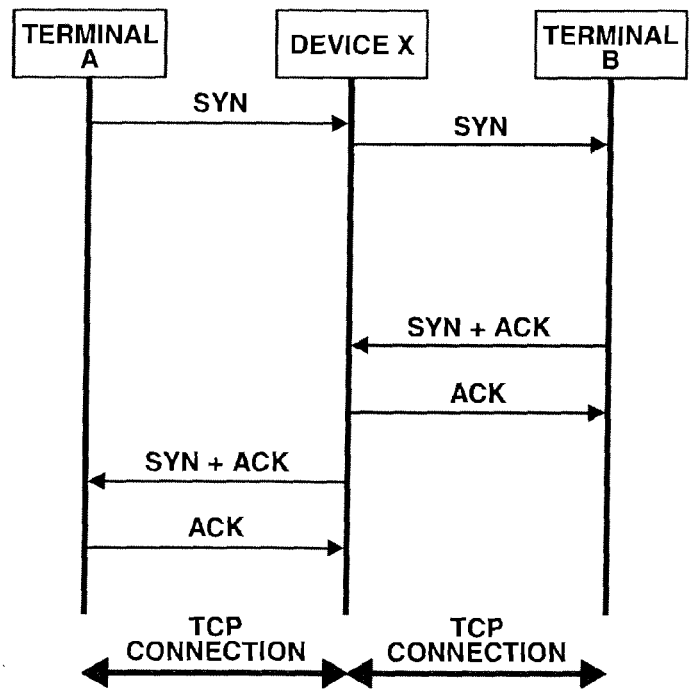

FIG. 3A shows a case where relay devices X, Y exist. On the other hand, FIG. 3B shows a case where only relay device X or only relay device Y exists. FIG. 3B is a diagram showing division for a case where only relay device X exists, and is applied to an application example 2, an application example 3, and an application example 5.

In this case, relay device X confirms that the reply packet (SYN+ACK) from terminal B is added with no identifier in the TCP option of type code 07, and thereafter sends an ACK packet back to terminal B, and sends a (SYN+ACK) packet to terminal A.

Embodiment 2

An embodiment 2 employs the TCP options of type codes 06, 07. Type code 06 is "Echo (obsoleted by option 8) RFC1072". Type code 07 is "Echo Reply (obsoleted by option 8) RFC1072".

Figure 11:
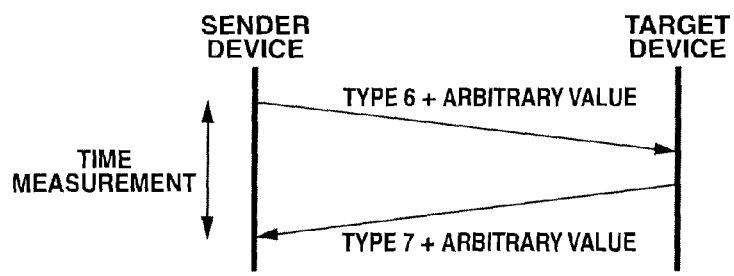
FIG. 11 is a diagram showing TCP option fields of types 06 and 07 in standard mode of use.

FIG. 11 is a diagram showing a sequence in standard mode of use of the TCP options of type codes 06 and 07. By definition, the TCP options of code types 06 and 07 are used for measuring a reply period in TCP congestion control. For example, when the sender device (relay device X) shown in FIG. 2 sends to the opposite target device (relay device Y) a packet in which an arbitrary number is set in type code 06, then the target device which has received the packet sends back to the sender device a packet in which the arbitrary number is set in type code 07. The sender device measures time when the packet in which the same number is set is reached, and uses it in congestion control.

Proactive information exchange is implemented by mutually sending an arbitrary number (packet) provided with a specific meaning, by using the function of the TCP options described above. The following describes a case in which relay device Y which has a comparable function as relay device X exists on the opposite side, and confirmation (authorization) is implemented by the method described above.

(1) Case where Similar Relay Device Y Exists

In case where a similar relay device Y exists on the opposite side of relay device X, relay device X confirms the existence of relay device Y by the following procedure.

Figure 12:
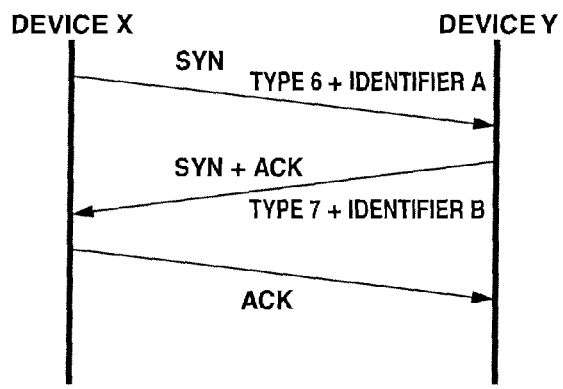
FIG. 12 is a diagram showing a sequence for acknowledgement in cases where a relay device Y exists.

The following describes a confirmation sequence shown in FIG. 12.

(a) Relay device X adds type code 06 containing a specific identifier A (for example, 0x4040404040, etc.) to the TCP option of a SYN packet for TCP three-way handshake, and sends same.

(b) When having received the identifier A, relay device Y confirms that similar relay device X exists on the opposite side, and relay device Y adds type code 07 containing a specific identifier B (for example, 0xC0C0C0C0C0, etc.) to the TCP option of a SYN+ACK packet, and sends same.

(c) When having received the identifier B, relay device X confirms that similar relay device Y exists on the opposite side, and returns ACK to complete three-way handshake, and thereby establish connection.

(2) Case where Device Compatible with TCP Options of Type Codes 06 and 07 Exists In cases where no similar relay device Y exists on the opposite side of relay device X, but only a device only compatible with the TCP options of type codes 06 and 07 exists, relay device X confirms by the following procedure that no similar relay device Y exists.

Figure 13:
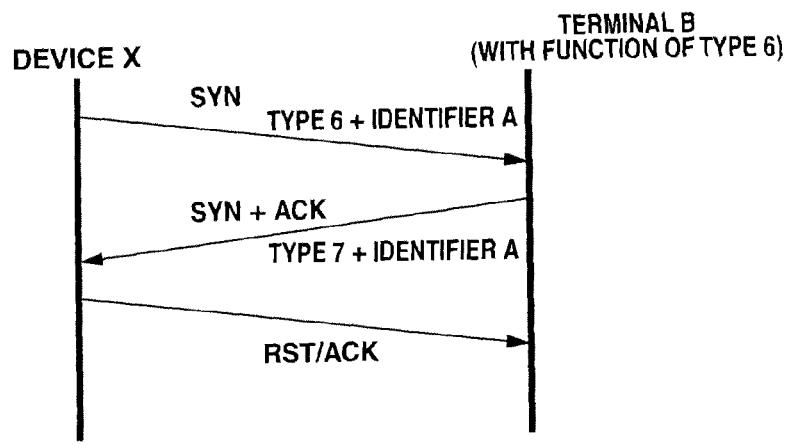
FIG. 13 is a diagram showing a sequence for acknowledgement in cases where no relay device Y exists and a terminal B is compatible with type 6.

The following describes a confirmation sequence shown in FIG. 13.

(a) Relay device X adds type code 06 containing a specific identifier A (for example, 0x4040404040, etc.) to the TCP option of a SYN packet for TCP three-way handshake, and sends same.

(b) When having received the identifier A, relay device Y adds type code 07 containing the received identifier A to the TCP option of a SYN+ACK packet, and sends back same, according to the standard regulation.

(c) When having received the identifier A, relay device X confirms that no similar relay device Y exists on the opposite side, and establishes connection by three-way handshake by returning ACK, or cancels the opening of connection by terminating the three-way handshake by returning RST (Reset).

(3) Case where Device Incompatible with TCP Options of Type Codes 06 and 07 Exists In cases where no similar relay device Y exists on the opposite side of relay device X, but a device incompatible with the TCP options of type codes 06 and 07 exists, relay device X confirms by the following procedure that no is similar relay device Y exists.

Figure 14:
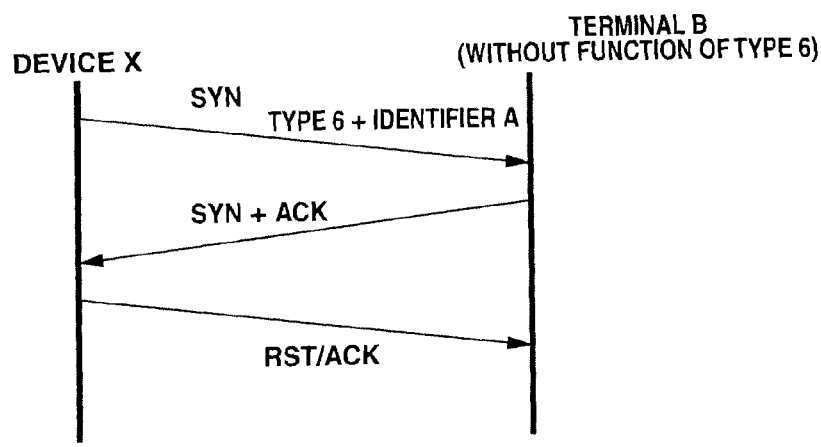
FIG. 14 is a diagram showing a sequence for acknowledgement in cases where no relay device Y exists and terminal B is incompatible with type 6.

The following describes a confirmation sequence shown in FIG. 14.

(a) Relay device X adds type code 06 containing a specific identifier A (for example, 0x4040404040, etc.) to the TCP option of a SYN packet for TCP three-way handshake, and sends same.

(b) Relay device Y returns a SYN+ACK packet with no TCP option added.

(c) When having received the identifier A, relay device X confirms that no similar relay device Y exists on the opposite side, and establishes connection by three-way handshake by returning ACK, or cancels the opening of connection by terminating the three-way handshake by returning RST (Reset).

Embodiment 3

An embodiment 3 employs the TCP option of type 19. Type 19 is "MD5 Signature Option RF2385".

Figure 15:
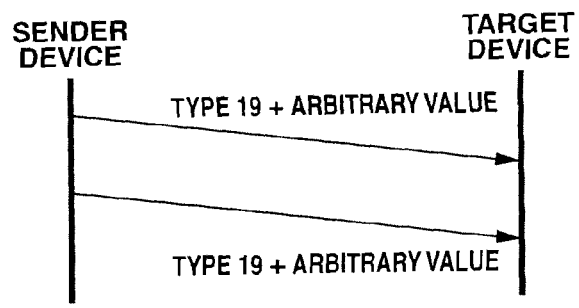
FIG. 15 is a diagram showing a TCP option field of type 19 in standard mode of use.

FIG. 15 is a diagram showing a sequence in standard mode of use of the TCP option of type 19. By definition, type 19 is an option intended for BGP (Border Gateway Protocol), which is used for signature based on MD5 hash value of the TCP segment. Every TCP segment flowing over a BGP session is added with this option for protecting the BGP session.

Embodiment 3 implements proactive information exchange by mutually sending an arbitrary number provided with a specific meaning, by using the function of the TCP option shown in FIG. 15. However, this scheme cannot be used over BGP sessions, because this scheme is in conflict with the standard usage over BGP sessions. Accordingly, this scheme is limited to sessions except BGP sessions. The following describes a case in which relay device X confirms or authorizes by the above method that relay device Y having a similar function exists on the opposite side.

(1) Case where Similar Relay Device Y Exists

Figure 16:
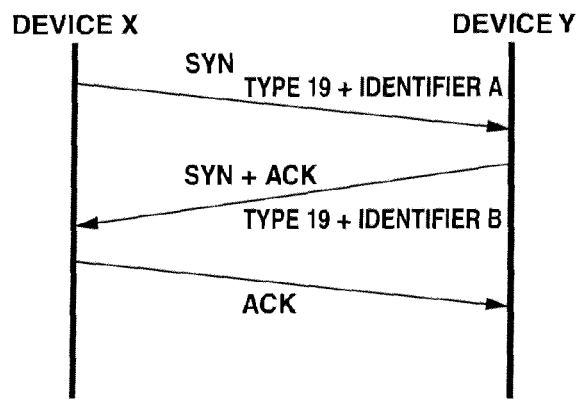
FIG. 16 is a diagram showing a sequence for acknowledgement in cases where relay device Y exists.

FIG. 16 is a diagram showing a confirmation sequence for cases where similar relay device Y exists on the opposite side. In FIG. 16, relay device X confirms the existence of relay device Y by the following procedure. If the target TCP port number is BGP (179), no confirmation is performed.

(a) Relay device X adds type code 19 containing a specific identifier A (for example, 0x4040404040, etc.) to the TCP option of a SYN packet for TCP three-way handshake, and sends same.

(b) When having received the identifier A, relay device Y confirms that similar relay device X exists on the opposite side, and relay device Y adds type code 19 containing a specific identifier B (for example, 0xC0C0C0C0C0, etc.) to the TCP option of a SYN+ACK packet, and sends same.

(c) When having received the identifier B, relay device X confirms that similar relay device Y exists on the opposite side, and returns ACK to complete three-way handshake, and thereby establish connection.

(2) Case where Device Incompatible with TCP Option of Type Code 19 Exists

In cases where no similar relay device Y exists on the opposite side of relay device X, relay device X confirms by the following procedure that no similar relay device Y exists. If the target TCP port number is BGP (179), no confirmation is performed.

Figure 17:
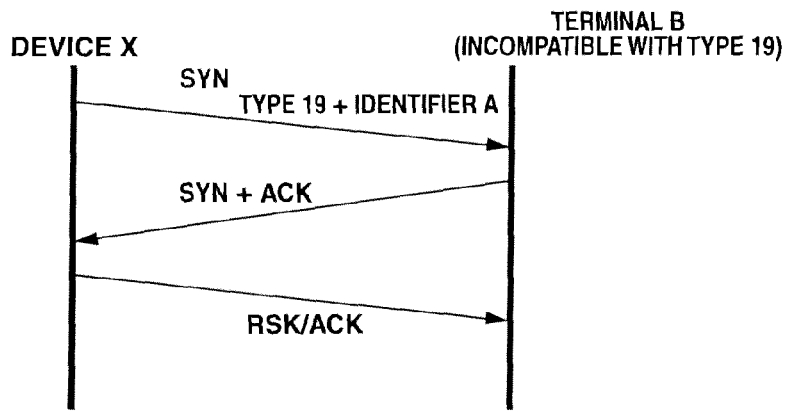
FIG. 17 is a diagram showing a sequence for acknowledgement in cases where no relay device Y exists and terminal B is incompatible with type 19.

The following describes a confirmation sequence shown in FIG. 17.

(a) Relay device X adds type code 19 containing a specific identifier A (for example, 0x4040404040, etc.) to the TCP option of a SYN packet for TCP three-way handshake, and sends same.

(b) Relay device Y returns a SYN+ACK packet with no TCP option added.

(c) With reference to the condition that relay device X has failed to receive the TCP option of type code 19, relay device X confirms that no similar relay device Y exists on the opposite side, and establishes connection by three-way handshake by returning ACK, or cancels the opening of connection by terminating the three-way handshake by returning RST (Reset).

In embodiment 3 described above, no special packet is used. This serves to eliminate the necessity of changing path-through setting of a firewall, etc., and allow to implement extended functions by defining a plurality of identifiers.

INDUSTRIAL APPLICABILITY

The present invention in the form of embodiment 1 is applicable to application examples described below.

Application Example 1

Figure 4:
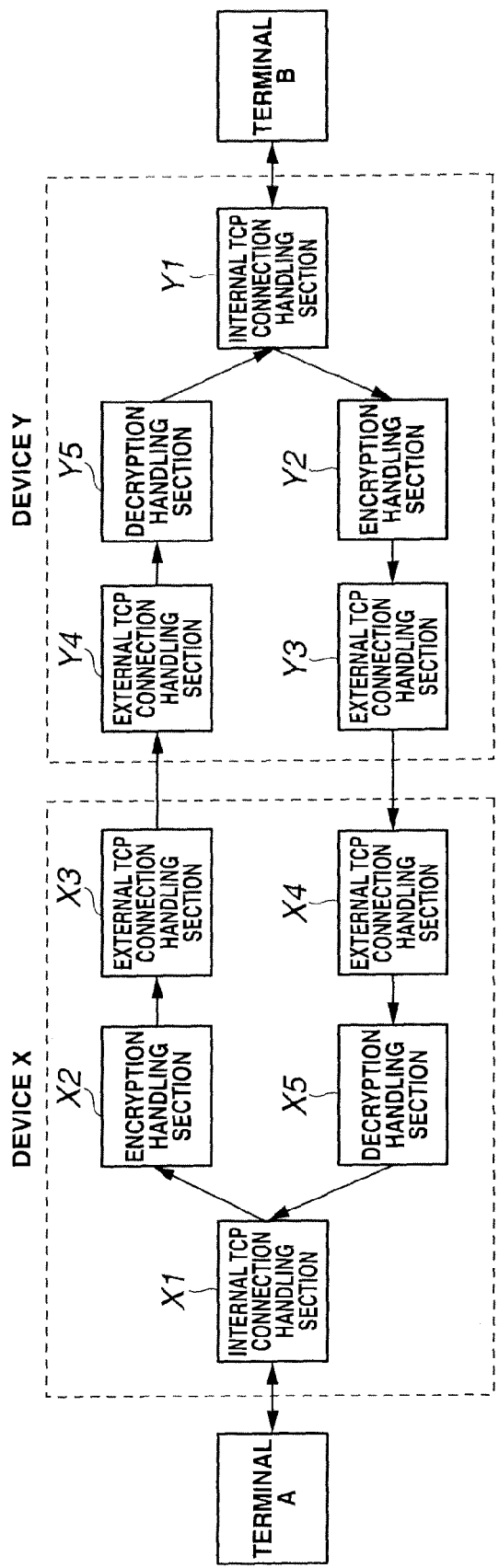
FIG. 4 is a block configuration diagram showing an encrypted communication device according to an application example 1.

FIG. 4 shows an encrypted communication device according to this application example. The encrypted communication device is composed of a terminal A—a device X—a device Y—a terminal B. Device X is composed of an internal TCP connection handling section X1, an encryption handling section X2, external TCP connection handling sections X3, X4, and a decryption handling section X5. Device Y is composed of an internal TCP connection handling section Y1, an encryption handling section Y2, external TCP connection handling sections Y3, Y4, and a decryption handling section Y5.

In application example 1 configured as described above, data transmission from terminal A to terminal B is implemented by processing data from terminal A at internal TCP connection handling section X1 of device X, and then encrypting the data at encryption handling section X2, and inputting the data through external TCP connection handling section X3 to external TCP connection handling section Y4 of device Y, and then decrypting the data at decryption handling section Y5, and sending the data through internal TCP connection handling section Y1 to terminal B.

On the other hand, data transmission from terminal B to terminal A is implemented conversely by processing data at internal TCP connection handling section Y1 of device Y, and encrypting the data at encryption handling section Y2, and inputting the data through external TCP connection handling section Y3 to external TCP connection handling section X4 of device X, and then decrypting the data at decryption handling section X5, and sending through internal TCP connection handling section X1 to terminal A.

By allowing the encrypted communication device to function as described above, it is possible to achieve encrypted communication in the communication line from terminal A to terminal B or from terminal B to terminal A. For example, it is possible to achieve a function of proactive key exchange for encrypted communication by exchanging key information proactively.

Application Example 2

Figure 5:
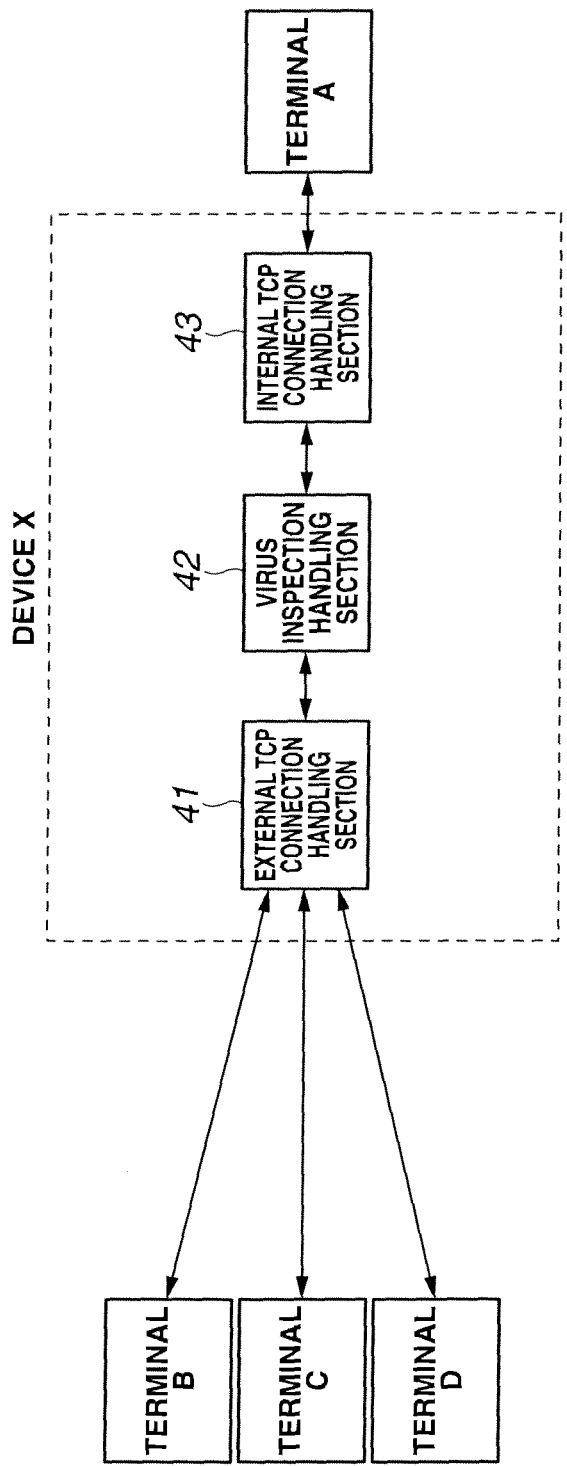
FIG. 5 is a block configuration diagram showing an antivirus device according to an application example 2.

FIG. 5 shows an anti-virus device according to this application example 2. The anti-virus device is composed of a terminal A—a device X—terminals B, C, D. Device X is composed of an external TCP connection handling section 41, a virus inspection handling section 42, and an internal TCP connection handling section 43. The thus-configured device X performs virus inspection at virus inspection handling section 42 during a process of relay of TCP communication, and interrupts TCP communication failed in the inspection. For example, this prevents unauthorized accesses from terminal A to terminals B, C, D, or unauthorized accesses from terminals B, C, D to terminal A.

Application Example 3

Figure 6:
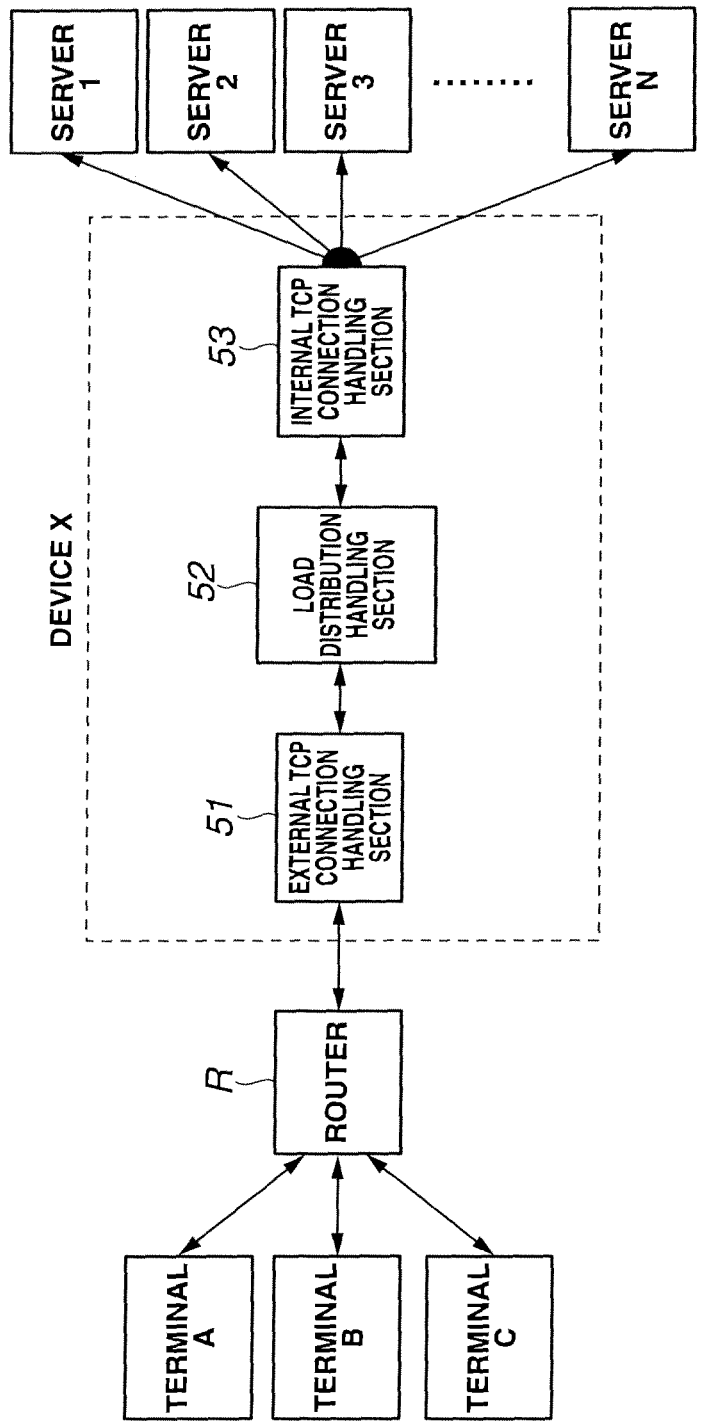
FIG. 6 is a block configuration diagram showing a load distributing device according to an application example 3.

FIG. 6 shows a load distributing device according to this application example. The load distributing device is composed of terminals A, B, C, a router R, a device X, and a plurality of servers 1-N. Device X is composed of an external TCP connection handling section 51, a load distribution handling section 52, and an internal TCP connection handling section 53. In the thus-configured load distributing device, device X on the front side of servers 1-N can achieve load distribution by distributing transmission to suitable servers 1-N depending on load condition.

For example, terminals A, B, C connect to a public IP address. At this instant, device X selects one of servers 1-N depending on load conditions of servers 1-N, and relays TCP connection. Accordingly, terminals A-C seem to be connected by TCP to the public IP address. On the other hand, servers 1-N seem to be connected by their respective different IP addresses to an IP address of an external terminal.

Application Example 4

Figure 7:
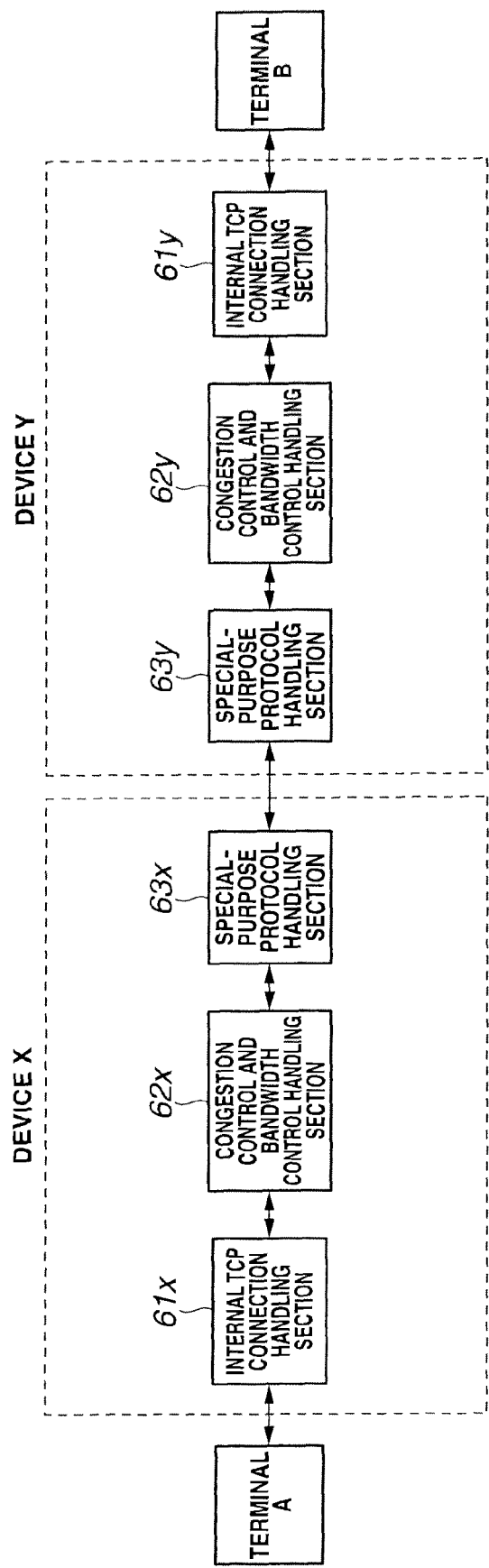
FIG. 7 is a block configuration diagram showing a bandwidth control device according to an application example 4.

FIG. 7 shows a bandwidth control device according to this application example. The bandwidth control device is composed of a terminal A—a device X—a device Y—a terminal B. Device X is composed of an internal TCP connection handling section 61x, a congestion control and bandwidth control handling section 62x, and a special-purpose protocol handling section 63x. Device Y is composed of an internal TCP connection handling section 61y, a congestion control and bandwidth control handling section 62y, and a special-purpose protocol handling section 63y.

In the thus-configured arrangement of terminal A—device X—device Y—terminal B, precise congestion control and bandwidth control is performed with a special-purpose protocol between device X and device Y, thereby making it possible to achieve a bandwidth control suitable for a line which cannot be handled with general TCP.

Application Example 5

Figure 8:
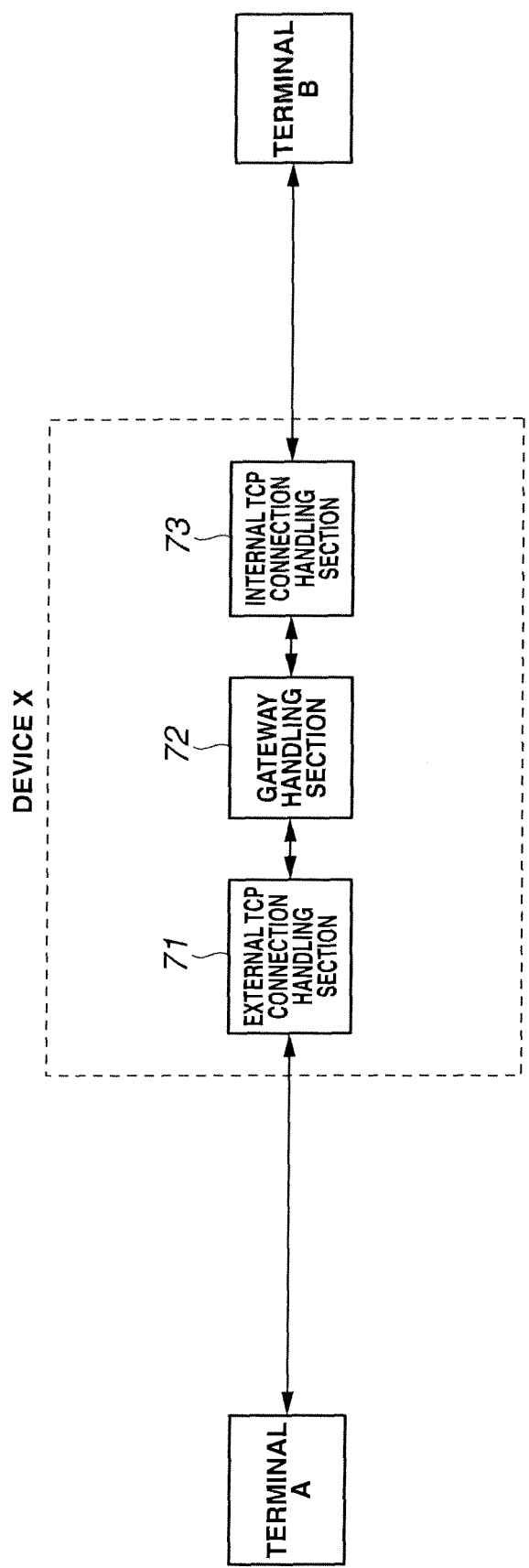
FIG. 8 is a block configuration diagram showing a gateway device according to an application example 5.
Figure 9:
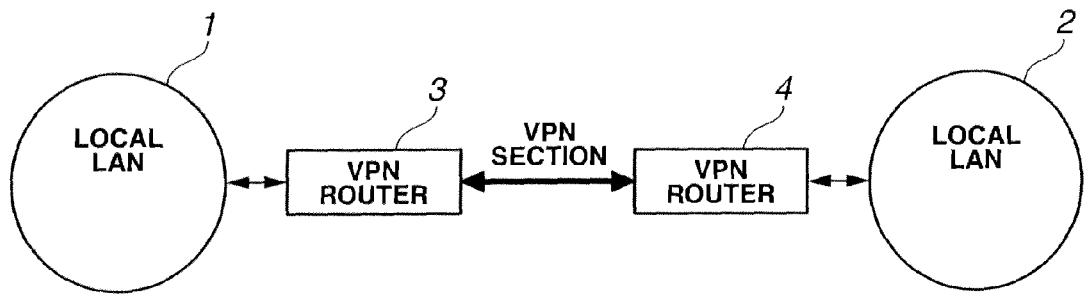
FIG. 9 is a diagram showing a LAN-to-LAN-connecting VPN.
Figure 10:
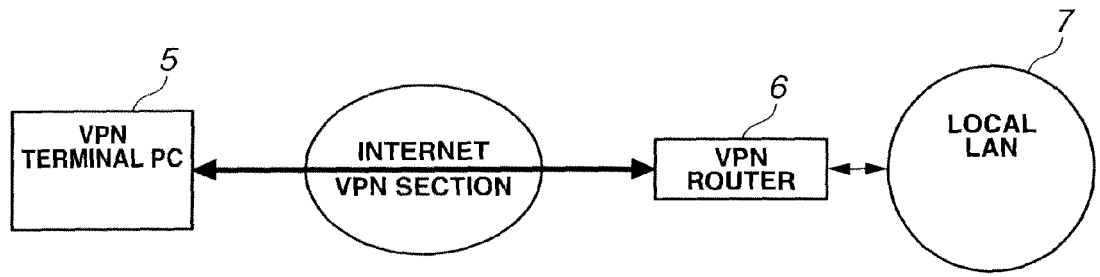
FIG. 10 is a diagram showing a remote access VPN.

FIG. 8 shows a gateway device according to this application example. The gateway device is composed of a terminal A—a device X—a terminal B. Device X is composed of an external TCP connection handling section 71, a gateway handling section 72, and an internal TCP connection handling section 73.

In the thus-configured device, terminal B operates based on a special protocol or special data. Terminal A requires a gateway device as a device for conversion for communication based on a normal protocol or normal data. Accordingly, device X is provided immediately on the front side of terminal B so as to allow conversion processing of protocol or data. Generally, a gateway device is provided with an IP address, and communications are made between terminal A and device X and between device X and terminal B. In contrast, it seems in this application example that device X does not exist.

Application Example 6

Application example 6 is configured to make it possible to incorporate all of the functions of embodiment 1 and application examples 1-5 into TCP protocol stack software in terminals, and thereby implement the functions by software without using an external hardware device.

In usual cases in which waiting for connection is performed by a TCP protocol stack, a socket is created proactively, and a port number for connection is assigned (Bind), and waiting for connection is performed (Accept).

However, in the case of relay device X in embodiment 1, the sender IP address, target IP address, sender port number, and target port number cannot be known beforehand. Accordingly, a SYN TCP packet which is sent first for connection is caught in promiscuous mode, and connection target information is obtained, and a socket for accepting connection is prepared, and procedures of binding and acceptance are performed proactively, and the TCP protocol stack is made to handle the packet. By these operations, it is possible to complete TCP connection while behaving as the opposite terminal B.

Figure 18:
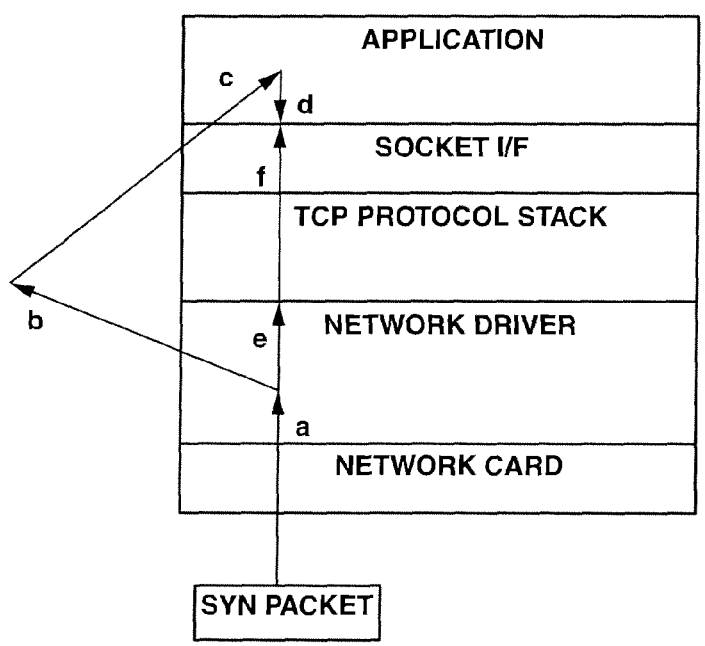
FIG. 18 is a diagram showing a procedure of operation according to an application example 6.

The following describes an operation procedure for the case described above with reference to the diagram of FIG. 18.

(a) First, a SYN packet is caught in promiscuous mode. (Network Driver)

(b) A target IP address and a target port number are obtained from the caught SYN packet. (Network Driver)

(c) An application is notified of the obtained target information. (Network Driver)

(d) Procedures of socket creation, binding, and acceptance are performed using the notified information. (Application)

(e) The SYN packet is passed to a TCP protocol stack. (Network Driver)

(f) TCP connection is established by a normal procedure, to complete connection of the socket. (TCP Protocol Stack)

DESCRIPTION OF REFERENCE SIGNS

A, B . . . Terminals
X, Y . . . . Relay Devices
NET . . . Network
11-14 . . . Transmission Lines

The invention claimed is:

1. A TCP communication system wherein:
first and second terminals are provided and connected by TCP to each other through a network;
a first relay device is provided in a transmission line between the first terminal and the network;
a second relay device is provided in a transmission line between the network and the second terminal;
the first and second relay devices are connected to each other through the network;
the first and second relay devices establish three divisional TCP connections between the first terminal and the first relay device, between the first relay device and the second relay device, and between the second relay device and the second terminal;
the first and second relay devices catch TCP connection SYN packets, and establish the TCP connections on behalf of the first and second terminals without having IP addresses; and
the first and second relay devices add a specific function to TCP communication through the TCP connections,
wherein the specific function includes:
an encrypted communication function implementing encryption and decryption;
an anti-virus function implementing a procedure for interrupting unauthorized TCP communication;
a load distributing function implementing a procedure for distributing transmission depending on load condition;
a bandwidth control function implementing a procedure for congestion control and bandwidth control; and
a gateway function implementing a procedure for relay for a special line,
wherein the first and second relay devices establish only the TCP connection between the first and second relay devices, when authorizing the first and second relay devices by exchanging information with each other during the procedure of connection before the procedure of connection is completed.

2. The TCP communication system as claimed in claim 1, wherein the first and second relay devices implement the authorization by exchanging information for model identification.

3. The TCP communication system as claimed in claim 1, wherein a function of proactive key exchange for encrypted communication is implemented by exchanging key information proactively.

* * * * *